United States Patent
Desai et al.

(10) Patent No.: US 10,713,163 B2
(45) Date of Patent: Jul. 14, 2020

(54) SET AWARE SYSTEM DATA AND MAPPING TABLES

(71) Applicant: Toshiba Memory Corporation, Minato-ku, Tokyo (JP)

(72) Inventors: Girish Desai, Cupertino, CA (US); Narasimhulu DharaniKumar Kotte, Fremont, CA (US)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 16/127,891

(22) Filed: Sep. 11, 2018

(65) Prior Publication Data

US 2020/0081834 A1    Mar. 12, 2020

(51) Int. Cl.
*G06F 3/00* (2006.01)
*G06F 12/06* (2006.01)
*G06F 3/06* (2006.01)

(52) U.S. Cl.
CPC ........ *G06F 12/0646* (2013.01); *G06F 3/0604* (2013.01); *G06F 3/0644* (2013.01); *G06F 3/0679* (2013.01); *G06F 2212/1041* (2013.01)

(58) Field of Classification Search
None
See application file for complete search history.

(56) References Cited

U.S. PATENT DOCUMENTS

| 9,152,682 B2 | 10/2015 | Ganapathi et al. |
| 2006/0136655 A1 | 6/2006 | Gorobets et al. |
| 2009/0293132 A1 | 11/2009 | Henry et al. |
| 2012/0203958 A1 | 8/2012 | Jones et al. |
| 2017/0322727 A1 | 11/2017 | Yeh |
| 2018/0276114 A1 | 9/2018 | Kodama |

FOREIGN PATENT DOCUMENTS

| EP | 2965208 | 1/2016 |
| JP | 2001-078103 | 3/2001 |

OTHER PUBLICATIONS

U.S. Appl. No. 15/800,742, filed Nov. 1, 2017, Steven Wells, "SSD Architecture Supporting Low Latency Operation", Specification (43 pages).

*Primary Examiner* — Midys Rojas
(74) *Attorney, Agent, or Firm* — White & Case LLP (57) ABSTRACT

A method of managing a solid state drive (SSD), comprising: storing a first set of data in a first plurality of non-volatile memory dies, the first plurality of non-volatile memory dies communicatively arranged in one or more first communication channels; storing a second set of data in a second plurality of non-volatile memory dies, the second plurality of non-volatile memory dies communicatively arranged in one or more second communication channels; generating a first set of system data corresponding only to the first set of data; generating a second set of system data corresponding only to the second set of data; and managing the first set of system data corresponding to the first set of data independently of the second set of system data corresponding to the second set of data, wherein the one or more first communication channel and the one or more second communication channel are communicatively coupled to one or more channel controllers, the one or more channel controls are communicatively coupled to a memory controller, and the first plurality of non-volatile memory dies and the second plurality of non-volatile memory dies are part of an array of non-volatile memory dies.

26 Claims, 6 Drawing Sheets

| CAPACITY | PERCENTAGE SAVED (4 SETS) | PERCENTAGE SAVED (8 SETS) |
|---|---|---|
| 1TB | 6.90% | 10.34% |
| 2TB | 6.67% | 10.00% |
| 4TB | 6.45% | 9.68% |
| 8TB | 6.25% | 9.38% |
| 16TB | 6.06% | 9.09% |
| 32TB | 5.88% | 8.82% |
| 64TB | 5.71% | 8.57% |
| 128TB | 5.56% | 8.33% |
| 256TB | 5.41% | 8.11% |

FIG. 6

SET AWARE SYSTEM DATA AND MAPPING TABLES

FIELD OF INVENTION

This invention generally relates to solid state drives (SSD) system data management, and in particular, system data management in SSDs that support IO Determinism.

BACKGROUND

SSDs have been replacing traditional magnetic storage devices such as hard disk drives (HDDs) as a common type of storage device used in both consumer and enterprise level systems.

Conventionally, SSD architectures and designs have primarily focused on obtaining a high average bandwidth or throughput for input and output (I/O) operations (i.e., reading and writing data). Compared to traditional magnetic storage devices such as HDDs, SSDs are capable of performing I/O operations that are hundreds, if not thousands, of times greater per second than HDDs. Such conventional SSDs are capable of obtaining such high average bandwidth through parallelism in its architecture.

As with any emerging technology, not all of the potential advantages and benefits of SSDs have been fully realized. Further, some developments are very recent and still only partially take advantage of the benefits provided by SSDs over traditional magnetic storage devices. For example, U.S. patent application Ser. No. 15/800,742 describes an SSD architecture that allows users, or host computers, to read and write to non-volatile memory dies in one distinct architecture set of an SSD without blocking access to, and thereby avoiding collusion with, commands directed at non-volatile memory die of a different distinct architecture set of the same SSD. U.S. patent application Ser. No. 15/800,742 is hereby fully incorporated by reference. However, there remains a long felt need to optimize treatment of system data in advanced SSDs.

SUMMARY OF THE INVENTION

According to certain aspects of the invention, an SSD operation will storing a first set of data in a first plurality of non-volatile memory dies, the first plurality of non-volatile memory dies communicatively arranged in one or more first communication channels and storing a second set of data in a second plurality of non-volatile memory dies, the second plurality of non-volatile memory dies communicatively arranged in one or more second communication channels. Further the method will include generating a first set of system data corresponding only to the first set of data; generating a second set of system data corresponding only to the second set of data; and managing the first set of system data corresponding to the first set of data independently of the second set of system data corresponding to the second set of data, wherein the one or more first communication channel and the one or more second communication channel are communicatively coupled to one or more channel controllers, the one or more channel controls are communicatively coupled to a memory controller, and the first plurality of non-volatile memory dies and the second plurality of non-volatile memory dies are part of an array of non-volatile memory dies.

According to some embodiments of the invention SSD operation will further include storing the first set of system data in a third plurality of non-volatile memory dies, and storing the second set of system data in a fourth plurality of non-volatile memory dies wherein the third plurality is associated with the first plurality, and the fourth plurality is associated with the second plurality.

According to other embodiments, SSD operation will include the first set of system data comprises at least a one or more first set address mapping tables corresponding only to the first plurality of non-volatile memory dies, and the second set of system data comprises at least a one or more second set address mapping tables corresponding only to the second plurality of non-volatile memory dies.

In yet other embodiments, SSD operation will comprise the first set of system data further comprises at least a first set mapping management table, a first set deallocate bitmap, and a first set valid cluster counter table corresponding only to the first plurality of non-volatile memory dies. In these embodiments, the second set of system data further comprises at least a second set mapping management table, a second set deallocate bitmap, and a second set valid cluster counter table corresponding only to the second plurality of non-volatile memory dies.

Certain embodiments of the invention will include writing the first set of system data, in the volatile memory of the SSD, that has not been previously written to a non-volatile memory of the SSD, to the third plurality of non-volatile memory dies. These embodiments will also include writing the second set of system data, in the volatile memory of the SSD, that has not been previously written to a non-volatile memory of the SSD, to the fourth plurality of non-volatile memory dies.

According to other embodiments, SSD operation will include assigning a priority level to each of the first set of data and the second set of data wherein, the first set of system data contains information indicative of the priority level of the first set of data and the second set of system data contains information indicative of the priority level of the first set of data.

In other embodiments of the invention, SSD operation will additionally include when receiving a plurality of commands from a host, wherein the plurality of commands from the host comprise at least one command directed at the first set of data and at least one command directed at the second set of set data, processing the plurality of commands from the host based on the priority level assigned to the first set of data and the priority level assigned to the second set of data.

According to still more embodiments, in some embodiments of the invention SSD operation will include determining if the command-target set of system data contains one or more dirty deallocated spaces. In some embodiments of the invention, if the command-target set of system data contains the one or more dirty deallocated spaces, performing a deallocation check on the command-target set of data, prior to executing the command from the host on command-target set of data. In other embodiments of the invention if the command-target set of system data does not contain the one or more dirty deallocated spaces, immediately executing the command from the host on the command-target set of data.

In other embodiments of the invention, SSD operation will include, in response to a command from a host, the command from the host comprising at least a target-information, wherein the target-information is indicative of either the first set of data or the second set of data: determining a command-target set of data, wherein the command-target set of data is either the first set of data or the second set of data based on the target-information, determining if the one or more first set address mapping tables or the one or more second set address mapping tables corresponding to the command-target set of data have been completely loaded into the volatile memory.

Aspects and embodiments of the present invention may include some of the following advantages: increased scalability of systems incorporating the claimed invention, reduce latency when processing commands, the ability to prioritize access to certain portions of the array of non-volatile memory dies and reduced space need for the address mapping table. Other advantages will be clear to those skilled in the art when from the detailed description of the invention.

DETAILED DESCRIPTION

Figure 1:
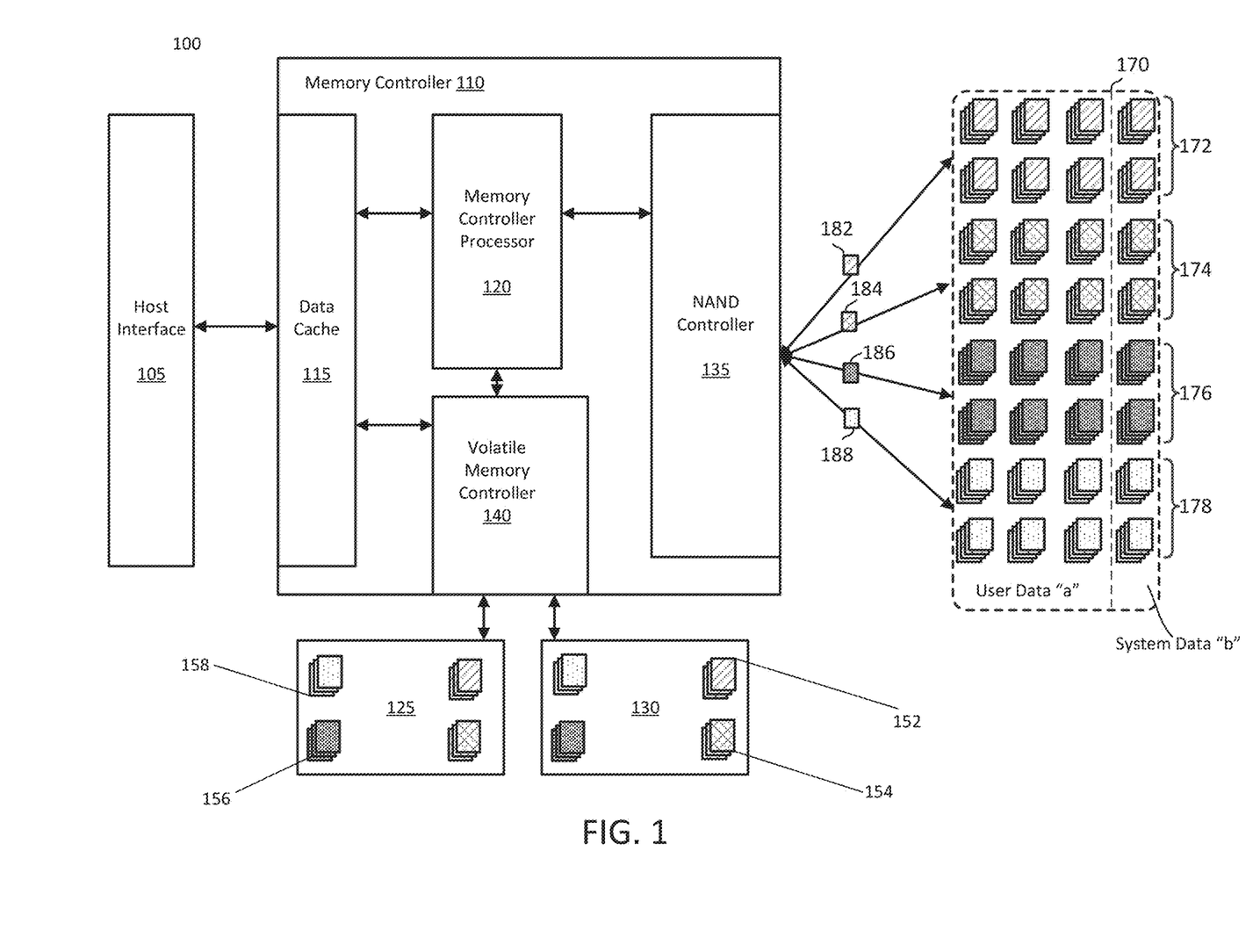
FIG. 1 is a high level block diagram of an SSD according to certain embodiments of the present invention.

FIG. 1 is a block diagram of the structure of an SSD 100, according to one embodiment of the present invention. As shown in FIG. 1, an SSD memory controller 110 is in communication with one or more host devices or host applications (not shown) through a host interface 105. The host device may be any suitable device, such as a computer or storage appliance. The SSD 100 includes both volatile memory devices 125/130 and an array of non-volatile memory dies 170. Although volatile memory is shown as two separate devices, volatile system management mapping device 125 and volatile memory address mapping device 130, this is for illustrative proposes only. SSD 100 may comprise a single volatile memory device housing volatile system management mapping device 125 and volatile memory address mapping device 130, or it may compromise more than two volatile memory devices further dividing the data stored in volatile system management mapping device 125 and volatile memory address mapping device 130. The volatile memory devices 125/130 and the array of non-volatile memory dies 170 are in communication with SSD memory controller 110 through volatile memory controller 140 and non-volatile memory controller 135, respectively.

Volatile memory devices 125/130 may be for example Dynamic Random Access Memory (DRAM). However, those who are skilled in the art will understand that other types of volatile memory, such as STT-MRAM, may be suited for use in SSD 100 without departing from the spirit of the invention.

The array of non-volatile memory dies 170 may be composed of NAND Flash Memory (NAND). However, those who are skilled in the art will understand that other types of non-volatile memory, such as NOR Flash Memory, may be suited for use in SSD 100 without departing from the spirit of the invention.

SSD memory controller 110 is in communication with one or more host devices or host applications (not shown) through a host interface 105 such that the SSD memory controller 110 can receive commands from one or more host devices or host applications. SSD memory controller 110 can additionally transmit data to one or more host devices or host applications via the host interface 105.

Host interface 105 can be, for example, a SCSI, a SATA, a PCIe, an ACHI, or a NVMe interface. However, those who are skilled in the art will understand that other interfaces can be used for the host interface 105 without departing from the spirit of the invention.

In order for SSD memory controller 110 to effectively receive and transmit data to and from the one or more host devices or host applications via the host interface 105, SSD memory controller 110 may additionally contain a data cache 115 to temporarily store incoming and outgoing data. Although, data cache 115 is drawn as a distinct element, this is only for illustrative purposes, data cache 115 may, for example, be alternatively contained within the memory controller processor 120. Those skilled in the art will understand that that other placement for data cache 115 within memory controller 110, or memory controller processor 120, may exist without departing from the spirit of the invention.

In order for SSD memory controller 110 to effectively communicate with the volatile memory devices 125/130, the memory controller 110 may additionally contain a volatile memory controller 140. Similarly, in order to effectively communicate with the array of non-volatile memory dies 170, SSD memory controller 110 may contain non-volatile memory controller 135. Although, volatile memory controller 140 and non-volatile memory controller 135 are shown as distinct elements, this is for ease of understanding proposes only. Those who are skilled in the art will understand that volatile memory controller 140 and non-volatile memory controller 135 may be part of the memory controller processor 120, or that other arrangements may exist without departing from the spirit of the invention.

In operation, volatile memory devices 125/130 store system data 152, 154, and 156, 158, information needed to effectively manage, access, and manipulate the data stored in the array of non-volatile memory dies 170. Such system data 152, 154, 156, and 158 may include at least a one or more logical to physical (L2P) address mapping tables which allows SSD memory controller 110 to use logical block addresses to identify corresponding physical blocks, a mapping management table which contains information needed to manage the address mapping tables, a deallocate bitmap which stores a list of information regarding which memory dies within the array of non-volatile memory dies 170 have been deallocated, or are to be deallocated, and a valid cluster counter which contains information regarding the number of clusters within the array of non-volatile memory dies 170 which are available to be written to. A cluster is the smallest addressable unit (i.e. the granularity) of user data within a non-volatile memory. The size of the cluster is typically selected according to the total size of the array of non-volatile memory dies, the memory page size of memory blocks within a memory die and the size of a logical block addressed by the host. The selection is a tradeoff between maintaining a fine granularity of addressing and keeping the size of L2P mapping tables to be manageable. For example, a cluster size of 4 KB might be used to address memory page sizes of 4, 8, 16 and 32 KB. Those who are skilled in the art will understand that there may be other system data needed to effectively manage the data stored in the array of non-volatile memory dies 170, or that some system data may be omitted in certain systems without departing from the spirit of the invention.

The array of non-volatile memory dies 170 is segregated at a physical level into distinct architectures sets 172, 174, 176, and 178 such that no one die of the array of non-volatile memory dies 170 is part of two or more distinct architecture sets 172, 174, 176, and 178. Although, distinct architectures sets 172, 174, 176, and 178 are illustrated as being equal in size, this is for exemplarily purposes only and there is no requirement that this be the case. Distinct architectures sets 172, 174, 176, and 178 can be of unequal sizes or some may be equal to each other but larger or smaller than others.

In order to effectively communicate with each of the distinct architectures sets 172, 174, 176, and 178, the non-volatile memory controller 135 may additionally communicate with a number of channel controllers 182, 184, 186, and 188 which in turn communicate individually or in combination with each of the distinct architectures sets 172, 174, 176, and 178, respectively.

Each of distinct architectures sets 172, 174, 176, and 178 is further separated into a user data area "a" and a system data area "b."

User data areas 172a, 174a, 176a, and 178a of the distinct architectures sets 172, 174, 176, and 178 store information which can be accessed the by the one or more host devices or host applications. Such data, may, for example, include operating systems, text files, images, or any other of a number of different types of data that needs to be store by the host device or application. It will be well understood by those with ordinary skill in the art that the aforementioned examples are merely an exemplary and non-limiting list of possibilities and that other data may be stored in user data areas 172a, 174a, 176a, and 178a of the distinct architectures sets 172, 174, 176, and 178.

System data areas 172b, 174b, 176b, and 178b of the distinct architectures sets 172, 174, 176, and 178 store the system data needed by the SSD memory controller 110 to effectively manage, manipulate, and access the data stored in the array of non-volatile memory dies 170. This is the same type of information as system data 152, 154, 156, and 158 stored in volatile memory devices 125/130. In order to ensure that system data is maintained during events of power loss or failure the system data stored in system data areas 172b, 174b, 176b, and 178b of the distinct architectures sets 172, 174, 176, and 178 must be periodically updated with any changes made to the system data 152, 154, 156, and 158 in the volatile memory devices 125/130.

According to one aspect of the invention, the system data stored in each of system data areas 172b, 174b, 176b, and 178b of the distinct architectures sets 172, 174, 176, and 178 only corresponds and contains information related to the distinct architecture set 172, 174, 176, or 178 that it is a part of. That is, for example, the system data stored in system data storage area 172b only contains information to access, manage, and manipulate data stored in distinct architecture set 172, and the system data stored in system data storage area 174b only contains information to access, manage, and manipulate data stored in distinct architecture set 174. In such an embodiment, the system data stored in system data storage area 174b cannot be used by the SSD memory controller 110 in any manner to access, manage, or manipulate data, either user data or system data, stored in any part of distinct architecture set 172.

During initial boot up of the SSD 100 the SSD memory controller 110 restores the necessary system data needed to begin operation. This includes L2P address mapping table information, a deallocate bitmap table, valid data counters for blocks and superblocks and data relating to any acknowledged buffered or cached host commands which remained outstanding at the time of the previous shutdown. In the event of a reboot after an unexpected or uncontrolled shutdown, the SSD memory controller 110 may need to regenerate any unsaved system data, for example by scanning all physical memory blocks in the array of non-volatile memory dies 170 for LBA information to build a reverse physical to logical address map from which it can reconstruct the L2P address mapping table.

As part of the boot up process of the SSD 100, the SSD memory controller 110 loads system data stored in system data areas 172b, 174b, 176b, and 178b of the distinct architectures sets 172, 174, 176, and 178 into the volatile memory devices 125/130.

If the SSD memory controller 110 detects a flag indicating that system data stored in system data areas 172b, 174b, 176b, and 178b of the distinct architectures sets 172, 174, 176, and 178 has never been loaded into the volatile memory devices 125/130, the memory controller 110 initializes the system data to a default value in volatile memory devices 125/130. Once any of the system data stored in volatile memory devices 125/130 has been updated, the flag is changed to indicate the occurrence of this event.

As previously mentioned, the system data 152, 154, 156, and 158 stored in the volatile memory devices 125/130 needs to be periodically stored in the corresponding system data areas 172b, 174b, 176b, and 178b of the distinct architectures sets 172, 174, 176, and 178. If the system data 152, 154, 156, and 158 stored in the volatile memory devices 125/130 is not loaded into the corresponding system data areas 172b, 174b, 176b, and 178b of the distinct architectures sets 172, 174, 176, and 178, critical data may be lost in the event of a power loss or failure of the SSD. In some embodiments, the whole of system data 152, 154, 156, and 158 will be written to the array of non-volatile memory dies 170 in one process, overwriting both data that has changed in volatile memory devices 125/130 but where the change has not been reflected in array of non-volatile memory dies 170, and data that has not been changed since it was loaded from system data areas 172b, 174b, 176b, and 178b of the distinct architectures sets 172, 174, 176, and 178 to volatile memory devices 125/130. Alternatively, only system data 152, 154, 156, and 158 that has not been previously written to system data areas 172b, 174b, 176b, and 178b of the distinct architectures sets 172, 174, 176, and 178 will stored, or overwrite previous data, in system data areas 172b, 174b, 176b, and 178b of the distinct architectures sets 172, 174, 176, and 178 in order to minimize the amount of data that has to be written during the update process. Yet another possibility is that system data stored 152, 154, 156, and 158 in volatile memory devices 125/130 will only be written to system data areas 172b, 174b, 176b, and 178b of the distinct architectures sets 172, 174, 176, and 178 on a distinct architecture set by distinct architecture set basis, either as whole or only portions that have change from since the last writing of system data 152, 154, 156, and 158 from volatile memory device 125/130 to the array of non-volatile memory dies 170.

Such a need, to update and manage system data stored in system data areas 172b, 174b, 176b, and 178b of the distinct architectures sets 172, 174, 176, and 178 arises as a result of the fact that system data 152, 154, 156, and 158 stored in volatile memory devices 125/130 is not static and is regularly updated in response to commands from the host device and during certain system management operations, such as garbage collection, wear leveling, or in response to errors during read or write operations.

For example, the host device or application can issue a write command to the SSD 100 containing data to be written. The command can specify a logical block address where the data that is to be written. The SSD memory controller 110 can determine an appropriate physical block address (which may be according to an hierarchy: memory device, die, block and memory page within the block) to which to write the data based on a number of factors, such as but not limited to, life cycle, temperature, or the program on the host device or application that is associated with the command. In some embodiments, the data may be written as a stripe of data across multiple physical blocks, dies or devices, for example divided into parts of a RAID stripe with additional parity data bits or divided into multiple data chunks using erasure coding. In some instances, the command will additionally specify which of distinct architecture sets 172, 174, 176, and 178 data will be written to. Alternatively, the SSD memory controller 110 may determine which of the distinct architecture sets 172, 174, 176, and 178 will have data written to in response to the command.

When the data is written to a physical number of dies in the array of non-volatile memory dies 170, the SSD 100 will need a way to locate that data for future use. In order to do so, the SSD memory controller 110 maintains an address mapping table that translates the logical block address to a physical block address of the array of non-volatile memory dies 170. Additionally, once the data is written there are now fewer valid clusters of physical blocks that can be written to and the valid cluster counter must be updated as well. In order to rapidly and effectively keep track of these changes to system data, the system data 152, 154, 156, and 158 stored in volatile memory devices 125/130 is updated first such that near instant access to the updated system data is available as rapidly as possible. In updating the system data 152, 154, 156, and 158 stored in volatile memory devices 125/130, the SSD memory controller 110 may need to determine the correct system data 152, 154, 156, or 158 to be updated. For example, if system data 152, 154, 156, and 158 stored in the memory devices 125/130 is logically or physically segregated in a manner corresponding to distinct architecture sets 172, 174, 176, and 178, the SSD memory controller 110 will determine the correct system data 152, 154, 156, or 158 based on the user data space 172a, 174a, 176a, or 178a that is the target of the command.

Those skilled in the art will realize that there are a number of different types of system data that needs to be updated when data is written, deleted, moved, or otherwise manipulated such that the SSD is able to accurately and effectively manage the data stored in the array of non-volatile memory dies 170 and that there is a number of different methods that the SSD memory controller 110 can use to correctly identify the system data 152, 154, 156, or 158 stored in volatile memory devices 125/130 that needs to be updated in response to a command.

In a certain embodiment of the invention, when a command is received by the SSD 100 from the host device or application, the SSD memory controller 110 determines if there is dirty system data, such as dirty deallocated spaces. That is, for example, prior to writing data to one of the user data areas 172a, 174a, 176a, or 178a, of the one of the distinct architecture sets 172, 174, 176, and 178, the SSD memory controller 110 determines if there are portion of the address mapping tables that have been deallocated but these change have not been reflected in the corresponding system data stored in system data areas 172b, 174b, 176b, or 178b on the array of non-volatile memory dies 170, then the SSD memory controller 110 determines whether the corresponding portion of the user data area 172a, 174a, 176a, or 178a, of the same distinct architecture set 172, 174, 176, or 178 has been deallocated. However, if the SSD memory controller 110 determines that there is no dirty system data, such as dirty deallocated spaces, then no check needs to be performed thereby eliminating the latency associated with an unnecessary check.

Figure 2:
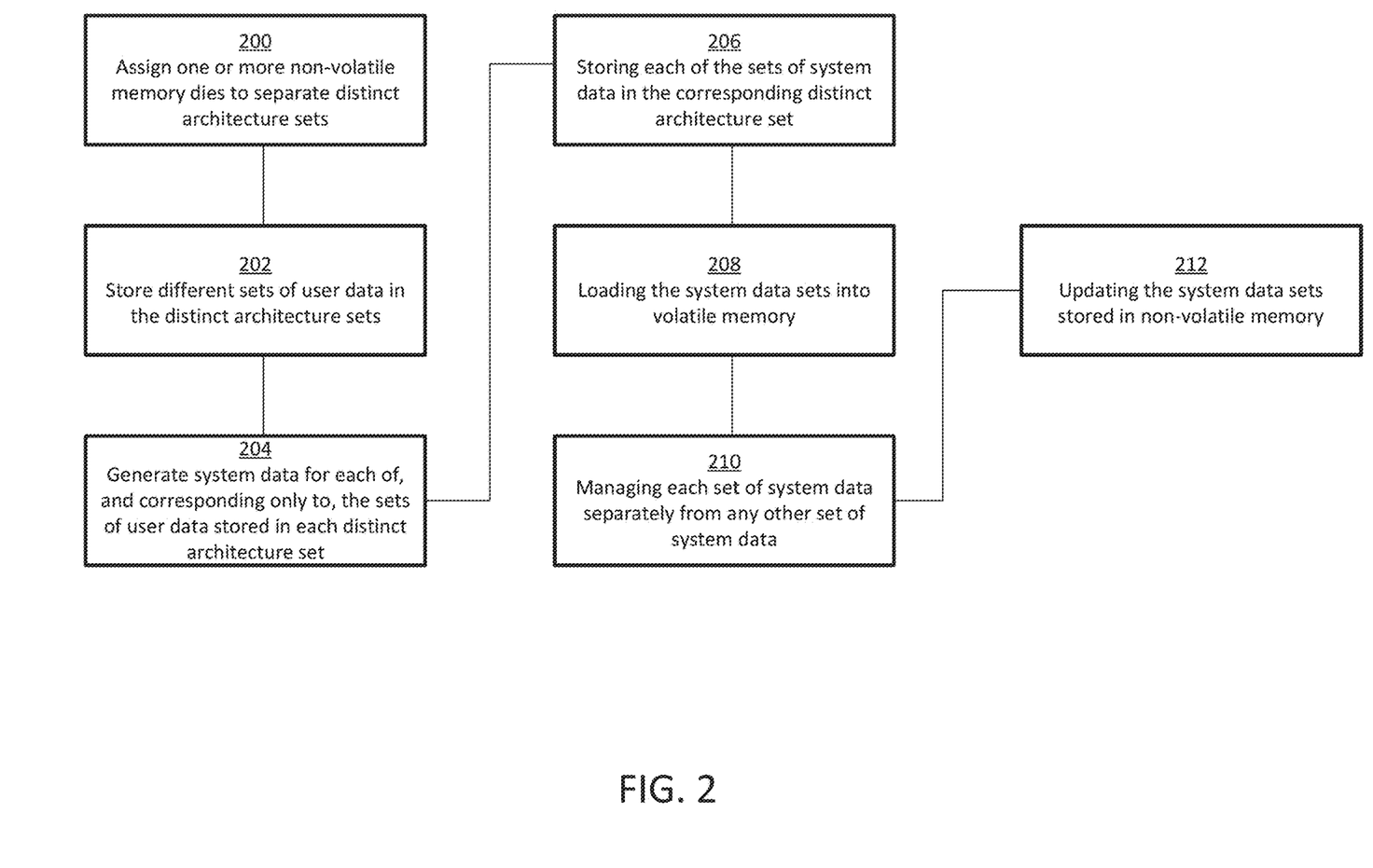
FIG. 2 is a flow chart of the process to prepare and operate an SSD according to certain embodiments of the invention.

FIG. 2 illustrates the process of preparing and using an SSD, like SSD 100, according to certain embodiments of the invention. At step 200, the memory controller 110 assigns non-volatile memory dies from the array of non-volatile memory dies 170 to distinct architecture sets 172, 174, 176, or 178. Next, at step 202, the memory controller 110 stores user data in the user data areas 172a, 174a, 176a, and 178a of the distinct architecture sets 172, 174, 176, and 178. A person skilled in the art will understand that not all of the distinct architecture sets 172, 174, 176, or 178 will contain user data in respective user data areas 172a, 174a, 176a, or 178a at all times.

At step 204, the memory controller 110 will generate system data corresponding to user data in the user data areas 172a, 174a, 176a, or 178a of the distinct architecture sets 172, 174, 176, or 178. Following this, at step 206, the memory controller 110 will store the system data in system data areas 172b, 174b, 176b, or 178b of the distinct architecture sets 172, 174, 176, or 178. Next, at step 208, the memory controller 110 will load the system data stored in system data areas 172b, 174b, 176b, and 178b of the distinct architecture sets 172, 174, 176, and 178 into volatile memory devices 125/130. A person of ordinary skill in the art will understand that this process may be inverse, or otherwise arranged in a different order, such as the memory controller 110 generating and first storing system data in volatile devices 125/130 and, at a later point, storing the system data in system data areas 172b, 174b, 176b, or 178b of the distinct architecture sets 172, 174, 176, or 178.

During operation, at step 210, memory controller 110 will manage the system data 152, 154, 156, and 158 in volatile devices 125/130 in response to commands from the host, received via the host interface 105, or in response to memory management operation such as garbage collection. Periodically, at step 212, the memory controller 110 will update the system data stored in system data areas 172b, 174b, 176b, and 178b of the distinct architecture sets 172, 174, 176, and 178 with changes made to system data 152, 154, 156, and 158 in volatile devices 125/130.

Figure 3:
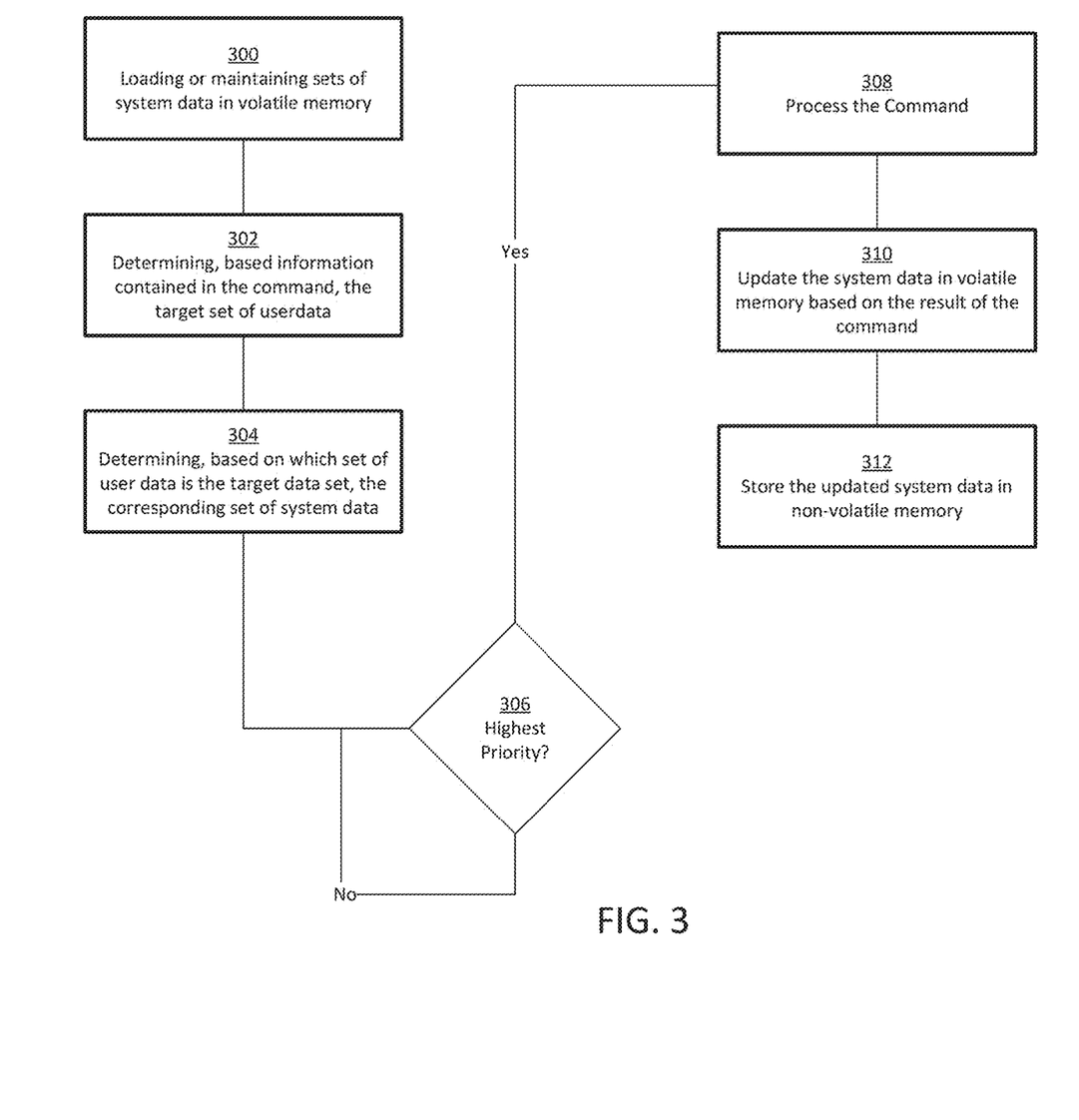
FIG. 3 is a high level flow chart overview of processing a command according to certain embodiments of the invention.

FIG. 3 illustrates a high level overview of SSD's 100 processing of commands from the host, received via the host interface 105. In order to process any command, at step 300, the memory controller 110 either loads or maintains system data 152, 154, 156, and 158 in volatile devices 125/130. When a command is received, via host interface 105, the memory controller 110, at step 302 determines, based on information contained within the command, which set(s) of user data stored in user data area 172a, 174a, 176a, or 178a of the distinct architecture sets 172, 174, 176, or 178 are the target of the command. Next, at step 304, the memory controller 110 determines the corresponding system data 152, 154, 156, and 158 stored in volatile devices 125/130 based on which user data area (172a, 174a, 176a, or 178a of the distinct architecture sets 172, 174, 176, or 178 is the target of the command.

If there are priority levels assigned to the distinct architecture sets 172, 174, 176, and 178 as part of system data 152, 154, 156, and 158 stored in volatile devices 125/130, then at step 306, the memory controller will determine if the command is directed at the highest priority distinct architecture sets 172, 174, 176, or 178 that currently has pending commands and processes the commands in order based on the priority. If there are no priority levels assigned, step 306 will be ignored and commands will be processed in the order they are received.

Then, at step 308, the memory controller 110 will process the command. Next, at step 310, the memory controller 110 will update the corresponding system data 152, 154, 156, and 158 stored in volatile devices 125/130 based on the results of the command. At a later point, at step 312, the memory controller 110 will proceed to update the system data stored in system data area(s) 172b, 174b, 176b, or 178b of the distinct architecture sets 172, 174, 176, or 178 with the current system data 152, 154, 156, and 158 stored in volatile devices 125/130.

Figure 4:
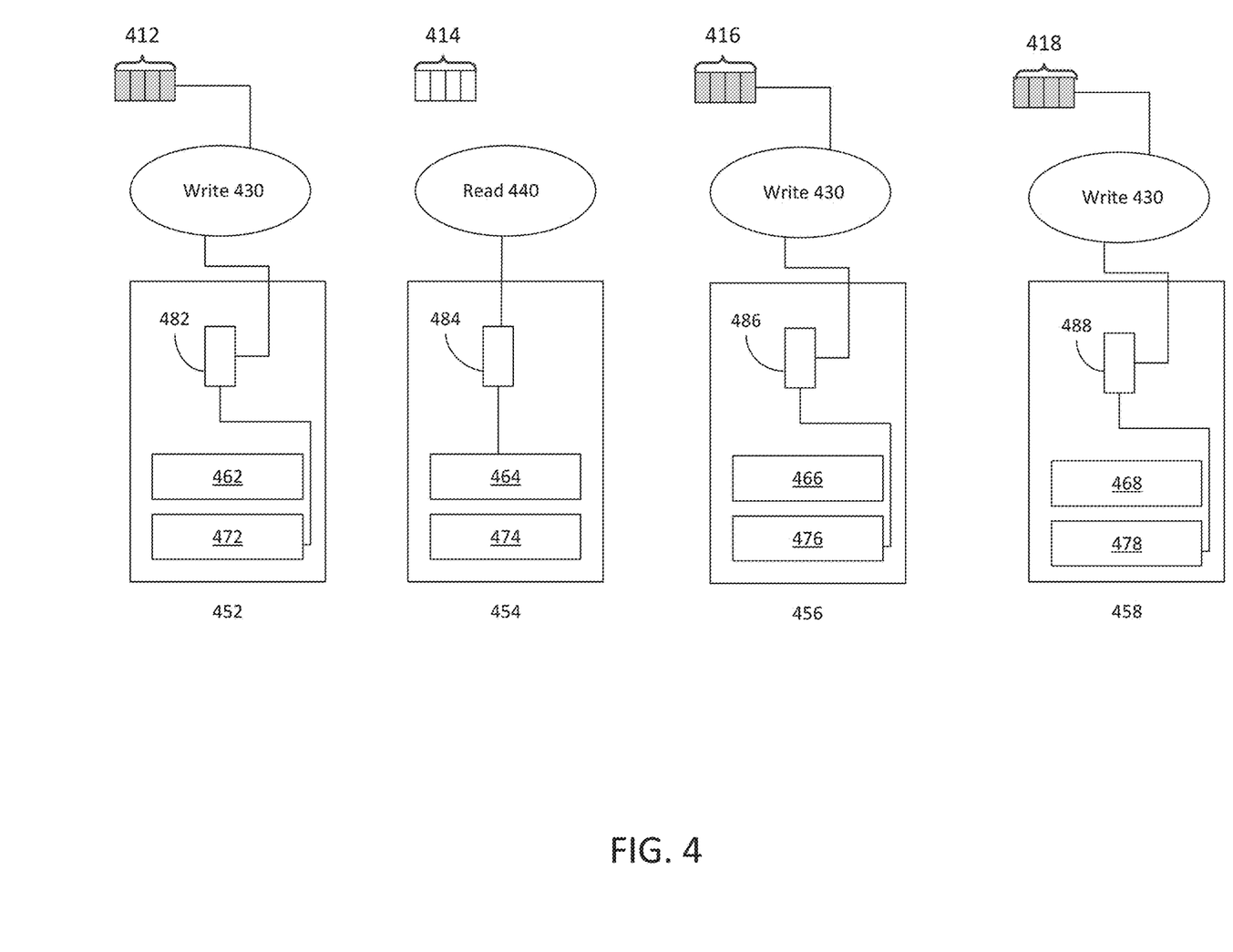
FIG. 4 is a logical block diagram of simultaneous user/host and system access of the non-volatile memory according to certain embodiments of the present invention.

FIG. 4 illustrates a high level view of parallel processing of a read command received through the host interface 105 and write commands from the memory controller 110. The distinct architecture sets 452, 454, 456, and 458, for exemplary purposes, correspond to distinct architecture set 172, 174, 176, and 178, respectively. Such that, the write commands 430 update the system data stored in system data space 172b, 176b, and 178b, based on changes made to system data 152, 156, or 158 in non-volatile memory devices 125/130, while the read command 440 reads data from user data space 174a.

In particular, FIG. 4 illustrates one advantage of keeping system data separate in the array of non-volatile memory dies 170 for each of distinct architecture sets 452, 454, 456, and 458, according to certain embodiments of the invention. This advantage is that dirty system data can be written to the corresponding distinct architecture set 452, 454, 456, or 458 of the array of non-volatile memory dies 170 without blocking access to other distinct architecture sets 452, 454, 456, or 458.

For example, distinct architecture sets 452, 456, and 458 all have corresponding dirty system data 412, 416, and 418, stored in volatile memory devices 125/130 whose changes are not reflected in system data space 472, 476, 478 of the distinct architecture sets 452, 456, and 458. Since each distinct architecture sets 452, 454, 456, and 458 have their own system data space 472, 474, 476, and 478 respectively, the dirty system data can be written to each system data space 472, 476, and 478 in parallel, using controllers 482, 486, and 488, with a system write command 430, directed at each distinct architecture sets 452, 456, and 458. These parallel system writes 430 do not block access to distinct architecture set 454 which has clean system data 414. As a result, the host device or application can issue a read command 440 to distinct architecture set 454 for data stored in user space 464 and by using controller 484 as this controller is not impacted by the use of controllers 482, 486, and 488 which carry out the write commands 430. This allows dirty system data to be written in the background when certain distinct architecture sets 452, 454, 456, or 458 are not in uses without blocking other distinct architecture sets 452, 454, 456, or 458. As a result, the need for dirty system data and dirty deallocation checks is reduced, this reduction results in reduced latency associated with these checks as they can be bypassed more often.

Conversely, in SSDs where there is a single monolithic block of system data, in the array of non-volatile memory dies 170 for distinct architecture sets 452, 454, 456, and 458, controllers 482, 484, 486, and 488 would all be taken up by write command 430 even though not all of the corresponding system data is affected. As a result, the read command 440 would be blocked or cause a channel collusion thereby creating additional latency between the issuing of the command by the host device or application and the execution of the command.

Figure 5:
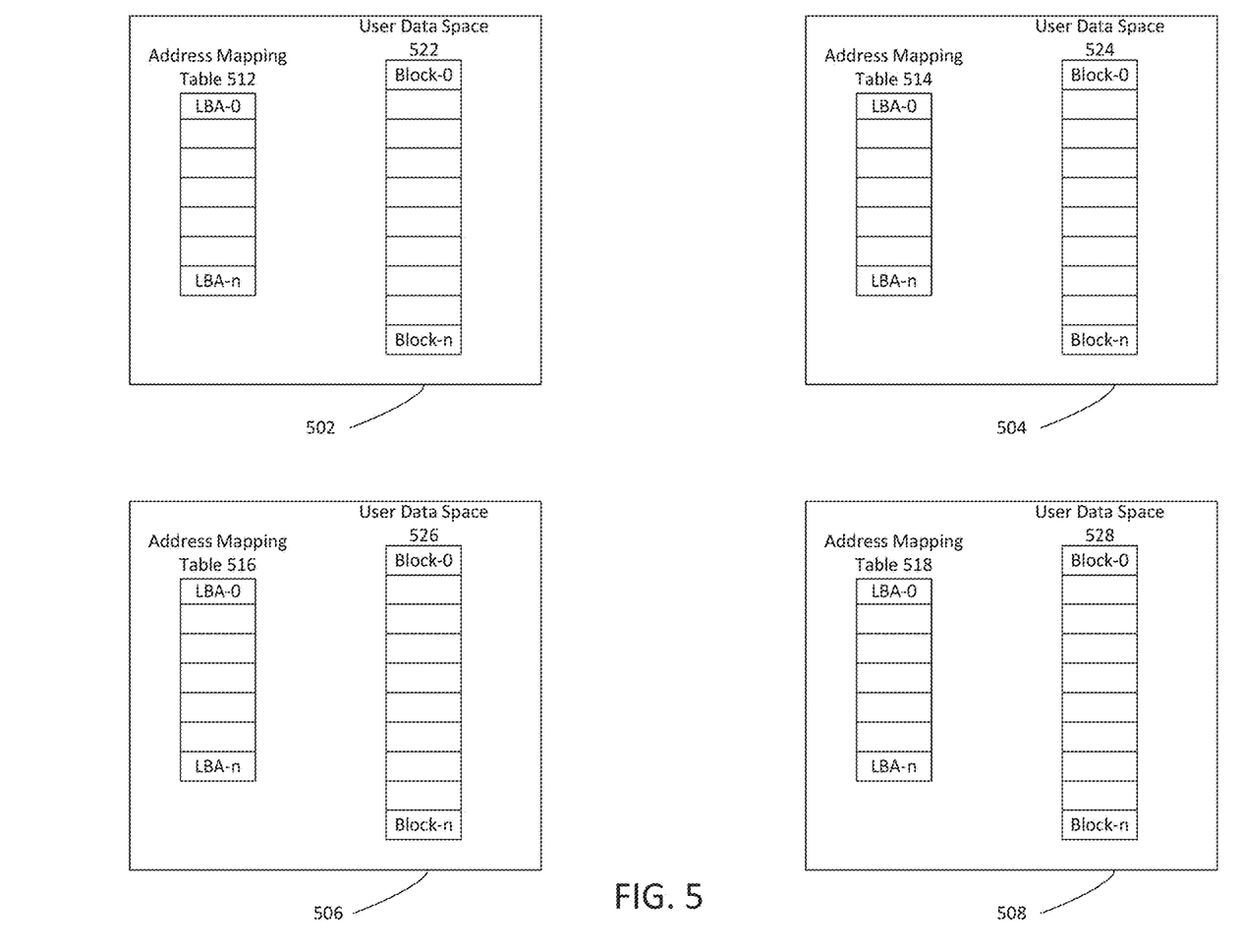
FIG. 5 shows a high level representation of an exemplary division of address mapping tables according to certain embodiments of the present invention.

FIG. 5, illustrates a high level representation of a division of the address mapping table per distinct architecture sets.

In traditional implementations of SSD architecture, the address mapping table is a monolithic table for the entirety of the array of non-volatile memory dies 170. However, according to certain embodiments of the present invention, there is no longer a need for this. When system data is stored separately in both volatile memory devices 125/130 and non-volatile system data storage areas 172b, 174b, 176b, and 178b for each of the distinct architecture sets 172, 174, 176, and 178, the address mapping tables may be split such that they only store the information needed to access the corresponding distinct architecture set 172, 174, 176, or 178.

Through splitting the address mapping table into distinct address mapping tables 512, 514, 516, and 518 corresponding to distinct architecture sets 502, 504, 506, and 508 a number of advantages can be achieved. Although only four different distinct architecture sets 502, 504, 506, and 508 are shown, this is for simplicity only and those skilled in the art will understand that there can be any number of distinct architecture sets and that the size of address mapping table 512, 514, 516, and 518 and user data space 522, 524, 526, and 528 are also not limited to the size illustrated.

In traditional approaches to address mapping tables, there is one address mapping table that maps logical block addresses to physical blocks no matter how many different distinct architecture sets exist on the SSD. While this approach may work for systems with numerous different distinct architecture sets, such as distinct architecture sets 172, 174, 176, and 178, it fails to take advantage of this fact, and as a result incurs overhead penalties that can be eliminated.

When there is a single monolithic address mapping table, even if in a layered form where one mapping tables to points to a secondary mapping table and so on, the number of bits needed to properly address a particular physical space in the array of non-volatile memory dies 170 is $LOG_2(N)$ where N is equal to the number of logical blocks, referred to herein as 'super' blocks, in the user data space 522, 524, 526, and 528 multiplied by the number of clusters in each of those super blocks.

In an exemplary SSD with a capacity of 7160 gigabytes for the total user data space where each super block is 1 gigabyte and there are 262144 4 KB clusters in a super block, each entry in the address mapping table will be 31 bits ($LOG_2(7160*262144)$). In order to fully map the entirety of the user spaces 522, 524, 526, and 528 the address mapping table will require roughly 6.77 gigabytes (7160*262144 entries each of 31 bits, assuming the table is bit-packed to conserve space)). These 6.77 gigabytes are a pure overhead cost limiting the amount of space that can be devoted to user data or other needs.

However, in SSDs with distinct architecture sets, such as distinct architecture sets 502, 504, 506, and 508, there is no need for a single monolithic table. Since, data access is limited on per distinct architectures set basis portions of the address mapping table that correspond to one distinct architecture set never need to be concerned with addressing other distinct architecture sets. As a result, the monolithic address mapping table can spilt into a number of distinct architecture mapping tables 512, 514, 516, and 518. Those skilled in the art will understand that, while the specification evenly divides the address mapping table, it is entirely possible to take any number of hybrid approaches, such has have a single address mapping table for two distinct architectures sets and two more address mapping tables for the remain exemplary distinct architecture sets and still achieve the advantages of the certain embodiments of the present invention.

Assuming the distinct address mapping tables 512, 514, 516, and 518 are evenly divided among the different distinct architecture sets, 502, 504, 506, and 508, the number of bits need for each entry of the address mapping tables will be reduced. The logical block size will remain constant, but the number of blocks per set will be reduced by a factor of the number of sets, assuming that sets are of equal sizes. Since the number of logical blocks per set is reduced, the number of bits needed for each entry of the distinct address mapping tables 512, 514, 516, and 518 is reduced. The number of bits reduced in a system with equal sized distinct architecture sets 502, 504, 506, and 508 can be calculated by the equation $LOG_2(X)$ where X is the number of distinct architecture sets 502, 504, 506, and 508. In the exemplary SSD described above, but now using distinct address mapping tables 512, 514, 516, and 518 for four different distinct architecture sets 502, 504, 506, and 508 will only require 29 bits per entry to map the same number of user data spaces 522, 524, 526, and 528. This reduction means that each table will only need 1.56 gigabytes of space to store the entire table ($1790*262144*LOG_2(1790*262144)$ bits). All four address mapping tables 512, 514, 516, and 518 will only need 6.33 gigabytes in total, compared with the 6.77 gigabytes need if the same amount of user data space was mapped using a single monolithic address mapping table. As a result, by taking advantage of the distinct architecture sets 502, 504, 506, and 508, and the distinct address mapping tables 512, 514, 516, and 518 for each distinct architecture sets 502, 504, 506, and 508 the overall combined size of the distinct address mapping tables 512, 514, 516, and 518 saves roughly 450 megabytes in the exemplary SSD described, compared with using a single monolithic address mapping table.

Figure 6:
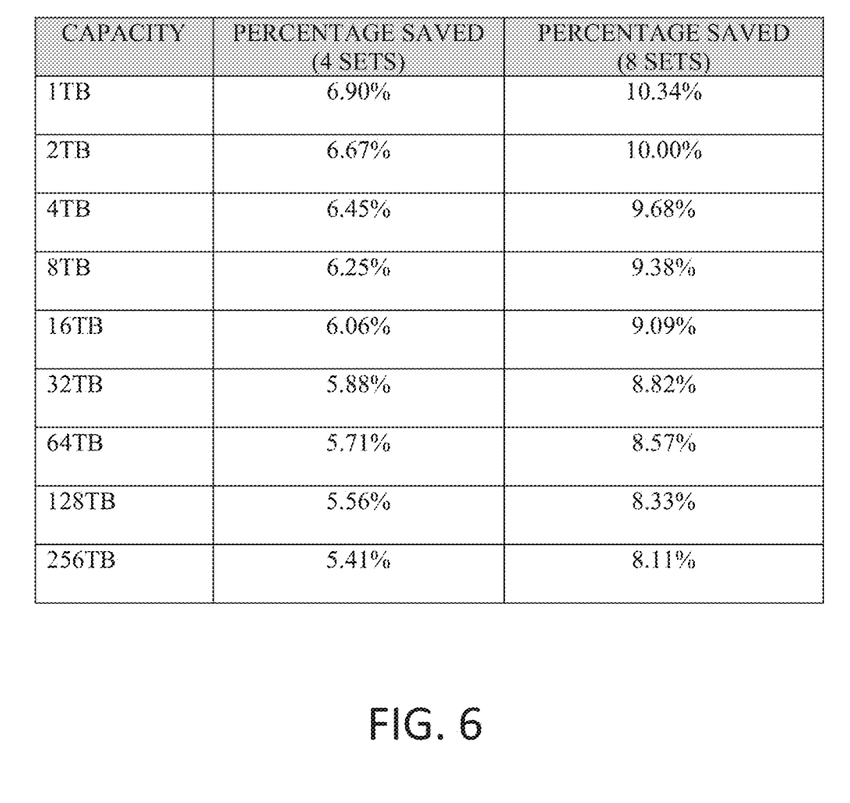
FIG. 6 is a table illustrating the percentage of space saved by using distinct address mapping tables according to some embodiments of the present invention.

FIG. 6 illustrates a table of general reductions in storage spaced used by the address mapping table achieved by distinct address mapping tables using four and eight sets. Lower capacity drives will experience a higher percentage saved whereas higher capacity drives will save more space overall. The more sets that are used the more savings in the combined size of the address mapping tables over a single monolithic address mapping table can be achieved.

The reduced number of bits needed for each entry in the distinct address mapping tables will additionally result in a reduced need for error correction when the distinct address mapping tables are loaded into the volatile memory devices 125/130 as there are fewer bits that can be in error. Further, the reduced number of bits needed for each entry in the distinct address mapping tables results in less space used to buffer the system data in volatile memory. Moreover, distinct address mapping tables according to certain aspects of the invention will reduce the amount of data that needs to be copied during system data recycling.

In a certain embodiment of the invention with distinct address mapping tables corresponding to the distinct architecture set 172, 174, 176, and 178, when a command is received by the SSD 100 from the host device or application to a particular distinct architecture sets 172, 174, 176, or 178, the SSD memory controller 110 determines if the corresponding distinct address mapping table has been fully loaded into volatile memory. If it has the SSD memory controller 110 can immediately begin executing the command, regardless if other distinct address mapping tables, corresponding to other distinct architecture sets, have been fully loaded. This allows systems using distinct address mapping tables to begin operation even if all of the addressing mapping information has not been loaded into volatile memory without any additional loading of address mapping information or particularized checks to see if the portion of the address mapping table needed to process the command from the host device or application has been loaded.

Although address mapping tables are generally described as a singular table mapping logical block address to physical block addresses, this is done for simplicity. Those skilled in the art will understand that an address mapping table may actually be a number of tiered tables where a top layer table translates the logical block address to an index of a middle layer which in turn translates it to an index of a lower level table and this process is repeated until the lower most table translates the starting logical block address to the corresponding physical block.

Another advantage of certain embodiments of the present invention is that each distinct architecture set 172, 174, 176, and 178 may be assigned a priority level. The priority level may be assigned by the manufacture such that certain distinct architecture sets 172, 174, 176, or 178 always have a higher priority level than others. Another option is that the SSD memory controller 110 assigns the priority levels based on the frequency of use, the life cycle conditions (e.g. the average number of program and erase cycles of the plurality of non-volatile memory dies that make up the distinct architecture set 172, 174, 176, or 178), or certain operating parameters, such as temperature, of each of the distinct architecture sets 172, 174, 176, or 178. Alternatively, the SSD memory controller 110 may assign the priority levels in response to commands from the host. The priority level for each distinct architecture set 172, 174, 176, or 178 is part of the corresponding system data stored in system data areas 172b, 174b, 176b, or 178b for that distinct architecture set 172, 174, 176, or 178. Further, the SSD memory controller 110 may assign priority levels to distinct architecture sets 172, 174, 176, and 178 based on whether any of the distinct architecture sets 172, 174, 176, or 178 are in deterministic mode such that commands directed to sets in deterministic mode are prioritized over sets in non-deterministic mode, or vice versa. As a result, when multiple commands, directed to different distinct architecture sets 172, 174, 176, or 178, are received from the host the SSD memory controller 110 is able to process the commands in an order according to the priority level of the target distinct architecture sets 172, 174, 176, or 178.

Yet another advantage of the certain embodiments of the present invention is that scalability of systems incorporating the present invention is increased. This advantage is derived from at least two separate aspects of the certain embodiments of the present invention. First, by keep system data separate and avoiding collusion when it is managed or updated in the system data storage areas 172b, 174b, 176b, or 178b, system incorporating the present invention may scale without worrying that minor system management processes will tie up the entire system. A problem that is increasingly likely where system data management temporarily blocks all other access to the other portions of the array of non-volatile memory dies 170 and the number of SSDs 100 and distinct architecture sets 172, 174, 176, and 178 is increased. From another prospective, by segregating the system data any check of the system data or any update to it will need to process a smaller set of data as compared with systems that have only one large block of system data, as the array of non-volatile memory dies 170 increases in size such a singular block would perpetually add to overhead by increasing the time needed to process and manage it. On the other hand, distinct system data sets 152, 154, 156, and 158 can remain roughly the same size and therefore the increase in overhead, as the size of the array of non-volatile memory dies 170 increases, is reduced. In some embodiments of the present invention, scalability is also improved by using the distinct approach to address mapping tables, previously described, the savings allow for more user data space to be added and will reducing the overhead cost of mapping the increased user data space. Further, allows for faster processing of logical block address translations as the number of bits per address that needs to be processed is reduced.

Other objects, advantages and embodiments of the various aspects of the present invention will be apparent to those who are skilled in the art and are within the scope of the description and the accompanying Figures. For example, but without limitation, structural or functional elements might be rearranged, or method steps reordered, consistent with the present invention. Similarly, principles according to the present invention could be applied to other examples, which, even if not specifically described here in detail, would nevertheless be within the scope of the present invention.

What is claimed is:

1. A method of managing a solid state drive (SSD), the method comprising:
   storing a first set of data in a first plurality of non-volatile memory dies, the first plurality of non-volatile memory dies communicatively arranged in one or more first communication channels;
   storing a second set of data in a second plurality of non-volatile memory dies, the second plurality of non-volatile memory dies communicatively arranged in one or more second communication channels;
   generating a first set of system data corresponding only to the first set of data;
   generating a second set of system data corresponding only to the second set of data; and
   managing the first set of system data corresponding to the first set of data independently of the second set of system data corresponding to the second set of data,
   wherein the one or more first communication channel and the one or more second communication channel are communicatively coupled to one or more channel controllers, the one or more channel controls are communicatively coupled to a memory controller, and the first plurality of non-volatile memory dies and the second plurality of non-volatile memory dies are part of an array of non-volatile memory dies.

2. The method of claim 1, the method further comprising:
   storing the first set of system data in a third plurality of non-volatile memory dies,
   storing the second set of system data in a fourth plurality of non-volatile memory dies; and
   wherein the third plurality is associated with the first plurality, and the fourth plurality is associated with the second plurality.

3. The method of claim 2, the method further comprising:
   loading the first set of system data and the second set of system data into a volatile memory of the SSD; and
   in response to a command from a host, the command from the host comprising at least a target-information, wherein the target-information is indicative of either the first set of data or the second set of data:
      determining a command-target set of data, wherein the command-target set of data is either the first set of data or the second set of data based on the target-information,
      determining the command-target set of system data, wherein the command-target set of system data is either the first set of system data or the second set of system data corresponding to the command-target set of data, and
      updating the command-target set of system data, in the volatile memory of the SSD, based on the command from the host.

4. The method of claim 3, the method further comprising:
   writing the first set of system data, in the volatile memory of the SSD, that has not been previously written to a non-volatile memory of the SSD, to the third plurality of non-volatile memory dies; and
   writing the second set of system data, in the volatile memory of the SSD, that has not been previously written to a non-volatile memory of the SSD, to the fourth plurality of non-volatile memory dies.

5. The method of claim 3, the method further comprising:
   determining if the command-target set of system data contains one or more dirty deallocated spaces.

6. The method of claim 5, the method further comprising:
   if the command-target set of system data contains the one or more dirty deallocated spaces, performing a deallocation check on the command-target set of data, prior to executing the command from the host on command-target set of data.

7. The method of claim 5, the method further comprising:
   if the command-target set of system data does not contain the one or more dirty deallocated spaces, immediately executing the command from the host on the command-target set of data.

8. The method of claim 1, wherein the first set of system data comprises at least one or more first set address mapping tables corresponding only to the first plurality of non-volatile memory dies; and
   the second set of system data comprises at least a one or more second set address mapping tables corresponding only to the second plurality of non-volatile memory dies.

9. The method of claim 8, wherein the first set of system data further comprises at least a first set mapping management table, a first set deallocate bitmap, and a first set valid cluster counter table corresponding only to the first plurality of non-volatile memory dies; and
   the second set of system data further comprises at least a second set mapping management table, a second set deallocate bitmap, and a second set valid cluster counter table corresponding only to the second plurality of non-volatile memory dies.

10. The method of claim 8, the method further comprising:
   in response to a command from a host, the command from the host comprising at least a target-information, wherein the target-information is indicative of either the first set of data or the second set of data:
      determining a command-target set of data, wherein the command-target set of data is either the first set of data or the second set of data based on the target-information, determining if the one or more first set address mapping tables or the one or more second set address mapping tables corresponding to the command-target set of data have been completely loaded into the volatile memory.

11. The method of claim 8, wherein address mapping bits in each entry of the one or more first set address mapping tables or the one or more second set address mapping tables correspond to only the first plurality of non-volatile memory dies or only to the second plurality of non-volatile memory dies, respectively.

12. The method of claim 1, the method further comprising:
assigning a priority level to each of the first set of data and the second set of data; and
wherein, the first set of system data contains information indicative of the priority level of the first set of data and the second set of system data contains information indicative of the priority level of the first set of data.

13. The method of claim 12, the method further comprising:
when receiving a plurality of commands from a host, wherein the plurality of commands from the host comprise at least one command directed at the first set of data and at least one command directed at the second set of set data, processing the plurality of commands from the host based on the priority level assigned to the first set of data and the priority level assigned to the second set of data.

14. A solid state drive (SSD) comprising:
an array of non-volatile memory dies arranged in one or more communication channels, the array comprising at least a first plurality of non-volatile memory dies and a second plurality of non-volatile memory dies;
one or more channel controllers communicatively coupled to the one or more communication channels;
a host interface;
the first plurality of non-volatile memory dies configured to store a first set of data;
the second plurality of non-volatile memory dies configured to store a second set of data;
one or more volatile memory devices; and
a memory controller communicatively coupled the first plurality of non-volatile memory dies and the second plurality of non-volatile memory dies via the one or more channel controllers, and communicatively coupled to the host interface and the one or more volatile memory devices, the memory controller configured to:
generate a first set of system data corresponding only to the first set of data,
generate a second set of system data corresponding only to the second set of data,
manage the first set of system data corresponding to the first set of data independently of the second set of system data corresponding to the second set of data.

15. The SSD of claim 14, the SSD further comprising:
a third plurality of non-volatile memory dies associated with the first plurality;
a fourth plurality of non-volatile memory dies associated with the second plurality; and
wherein the memory controller is further configured to store the first system data in the third plurality and store the second system data in the fourth plurality.

16. The SSD of claim 14, wherein the first set of system data comprises at least one or more first set address mapping tables corresponding to only the first plurality of non-volatile memory dies; and
the second set of system data comprises at least one or more second set address mapping tables corresponding only to the second plurality of non-volatile memory dies.

17. The SSD of claim 16, wherein the first set of system data further comprises at least a first set mapping management table, a first set deallocate bitmap, and a first set valid cluster counter table corresponding only to the first plurality of non-volatile memory dies; and
the second set of system data further comprises at least a second set mapping management table, a second set deallocate bitmap, and a second set valid cluster counter table corresponding only to the second plurality of non-volatile memory dies.

18. The SSD of claim 16, wherein the controller is further configured to:
in response to a command from a host, the command from the host comprising at least a target-information, wherein the target-information is indicative of either the first set of data or the second set of data:
determine a command-target set of data, wherein the command-target set of data is either the first set of data or the second set of data based on the target-information,
determine if the one or more first set address mapping tables or the one or more second set address mapping tables corresponding to the command-target set of data have been completely loaded into the volatile memory.

19. The SSD of claim 16, wherein address mapping bits of each entry of the one or more first set address mapping tables or the one or more second set address mapping tables correspond to only the first plurality of non-volatile memory dies or only to the second plurality of non-volatile memory dies, respectively.

20. The SSD of claim 14, wherein the memory controller is additionally configured to:
load the first set of system data and the second set of system data into the one or more volatile memory devices,
in response to a command from the host interface, the command from the host interface comprising at least a target-information, wherein the target-information is indicative of either the first set of data or the second set of data:
determining a command-target set of data, wherein the command-target set of data is either the first set of data or the second set of data based on the target-information,
determining the command-target set of system data, wherein the command-target set of system data is either the first set of system data or the second set of system data corresponding to the command-target set of data, and
updating the command-target set of system data, in the one or more volatile memory devices, based on the command from the host.

21. The SSD of claim 20, wherein the memory controller is additionally configured to:
write the first set of system data, in the one or more volatile memory devices, to the third plurality of non-volatile memory dies; or write the second set of system data, in the one or more volatile memory devices, to the second plurality of non-volatile memory dies.

22. The SSD of claim 21, wherein when receiving a plurality of commands from the host interface, the plurality of commands from the host interface comprising at least one command directed at the first set of data and at least one command directed at the second set of set data, the controller is additionally configured to:

process the plurality of commands from the host based on the priority level assigned to the first set of data and the priority level assigned to the second set of data.

23. The SSD of claim 20, wherein the controller is further configured to:

determine if the command-target set of system data contains one or more dirty deallocated spaces.

24. The SSD of claim 23, wherein the controller is further configured to:

if the command-target set of system data contains one or more dirty deallocated spaces, perform a deallocation check on the command-target set of data, prior to executing the command from the host interface on the command-target set of data.

25. The SSD of claim 23, wherein the controller is further configured to:

if the command-target set of system data does not contain one or more dirty deallocated spaces, immediately executing the command from the host interface on the command-target set of data.

26. The SSD of claim 14, wherein the memory controller is further configured to assign a priority level to the first set of data and the second set of data; and wherein, the first set of system data contains information indicative of the priority level of the first set of data and the second set of system data contains information indicative of the priority level of the first set of data.

* * * * *